(12) United States Patent
Christiano

(10) Patent No.: US 11,478,972 B2
(45) Date of Patent: Oct. 25, 2022

(54) DIAGNOSTIC TROUBLESHOOTING SYSTEM FOR AN EXTRUSION SYSTEM

(71) Applicants: Davis-Standard, LLC, Pawcatuck, CT (US); John P. Christiano, Old Lyme, CT (US)

(72) Inventor: John P. Christiano, Old Lyme, CT (US)

(73) Assignee: Davis-Standard, LLC, Pawcatuck, CT (US)

( * ) Notice: Subject to any disclaimer, the term of this patent is extended or adjusted under 35 U.S.C. 154(b) by 0 days.

(21) Appl. No.: 17/275,478

(22) PCT Filed: Sep. 13, 2019

(86) PCT No.: PCT/US2019/051009
§ 371 (c)(1),
(2) Date: Mar. 11, 2021

(87) PCT Pub. No.: WO2020/056253
PCT Pub. Date: Mar. 19, 2020

(65) Prior Publication Data
US 2021/0402669 A1 Dec. 30, 2021

Related U.S. Application Data

(60) Provisional application No. 62/730,741, filed on Sep. 13, 2018.

(51) Int. Cl.
*B29C 48/92* (2019.01)
*B29C 48/80* (2019.01)
(Continued)

(52) U.S. Cl.
CPC .......... *B29C 48/92* (2019.02); *B29C 48/2522* (2019.02); *B29C 48/2526* (2019.02);
(Continued)

(58) Field of Classification Search
CPC . B29C 48/2522; B29C 48/2526; B29C 48/80; B29C 48/802; B29C 48/82;
(Continued)

(56) References Cited

U.S. PATENT DOCUMENTS 4,249,876 A * 2/1981 Strausfeld ............ G05D 7/0605
425/145
RE31,903 E 6/1985 Faillace
(Continued)

FOREIGN PATENT DOCUMENTS

CN 202021800 U 11/2011
CN 102729500 B 10/2017
(Continued)

OTHER PUBLICATIONS

International Search Report issued in corresponding PCT Application No. PCT/US2019/051009, dated Dec. 11, 2019, pp. 1-3.
(Continued)

*Primary Examiner* — Xiao S Zhao
*Assistant Examiner* — Joseph S Leyson
(74) *Attorney, Agent, or Firm* — Robinson & Cole LLP

(57) ABSTRACT

An extrusion apparatus includes a diagnostic system with a material processing section and an extruder screw disposed for rotation in a barrel and surrounded by a shroud assembly. The apparatus includes a temperature control system with heater sand cooler. The apparatus includes a speed control apparatus that has a drive unit and a speed variation device that is coupled to the extruder screw. The apparatus includes a diagnostic system in communication with the material processing section and/or the speed control apparatus. The diagnostic system includes a sensor system in communication with the material processing section and/or the speed control apparatus; and a computer processor in communication with the sensor system and a computer. The computer (Continued)

processor includes a computer readable medium that employs one or more algorithms and that are executable by the computer to generate signals characterizing performance of the material processing section and/or the speed control apparatus.

13 Claims, 13 Drawing Sheets

(51) Int. Cl.
  *B29C 48/875* (2019.01)
  *B29C 48/96* (2019.01)
  *B29C 48/94* (2019.01)
  *B29C 48/25* (2019.01)

(52) U.S. Cl.
  CPC ............ *B29C 48/83* (2019.02); *B29C 48/875* (2019.02); *B29C 48/94* (2019.02); *B29C 48/96* (2019.02); *B29C 2948/924* (2019.02); *B29C 2948/92019* (2019.02); *B29C 2948/9239* (2019.02); *B29C 2948/92047* (2019.02); *B29C 2948/92085* (2019.02); *B29C 2948/92209* (2019.02); *B29C 2948/92295* (2019.02)

(58) Field of Classification Search
  CPC ..... B29C 48/83; B29C 48/832; B29C 48/834; B29C 48/875; B29C 48/92; B29C 48/94; B29C 48/96; B29C 2948/92019; B29C 2948/92047; B29C 2948/92085; B29C 2948/92114; B29C 2948/92209; B29C 2948/92295; B29C 2948/9239; B29C 2948/924
  See application file for complete search history.

(56) References Cited

U.S. PATENT DOCUMENTS

| | | | |
|---|---|---|---|
| 4,784,595 | A | 11/1988 | Halter |
| 6,627,127 | B1* | 9/2003 | Piovoso ................. B29B 7/726 |
| | | | 264/40.4 |
| 2004/0032040 | A1* | 2/2004 | Harris ..................... B29C 48/92 |
| | | | 264/40.1 |
| 2012/0090819 | A1* | 4/2012 | Christiano ............ B29C 48/834 |
| | | | 165/96 |
| 2016/0069446 | A1* | 3/2016 | Konruff .............. F16H 57/0441 |
| | | | 184/6.12 |
| 2016/0236392 | A1 | 8/2016 | Aoyama |
| 2018/0180516 | A1 | 6/2018 | Kostyukov |
| 2018/0224265 | A1* | 8/2018 | Kuhman ................. B29C 48/92 |

FOREIGN PATENT DOCUMENTS

| | | |
|---|---|---|
| EP | 2975480 A1 | 1/2016 |
| ES | 2532750 A1 | 3/2015 |
| JP | S61241124 A | 10/1986 |
| JP | S6331731 A | 2/1988 |
| JP | 2003311816 A | 11/2003 |
| WO | 0158667 A1 | 8/2001 |

OTHER PUBLICATIONS

Notification of Transmittal of the International Preliminary Report on Patentability issued in corresponding PCT Application No. PCT/US2019/051009, dated Nov. 17, 2020, pp. 1-28.

Notification of Reasons for Rejections issued in corresponding JP Application No. 2021-520448, dated May 31, 2022. pp. 1-4.

* cited by examiner

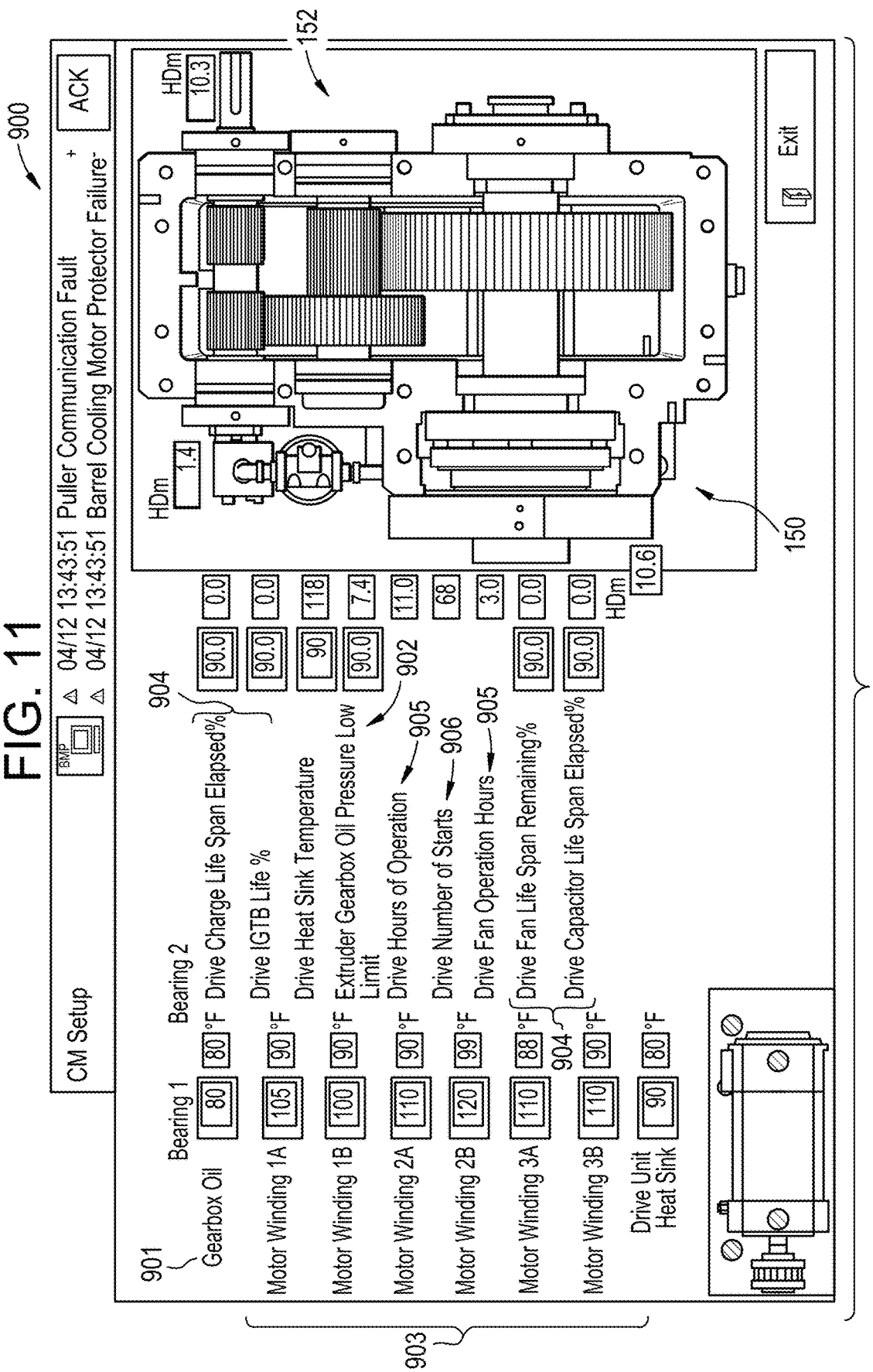

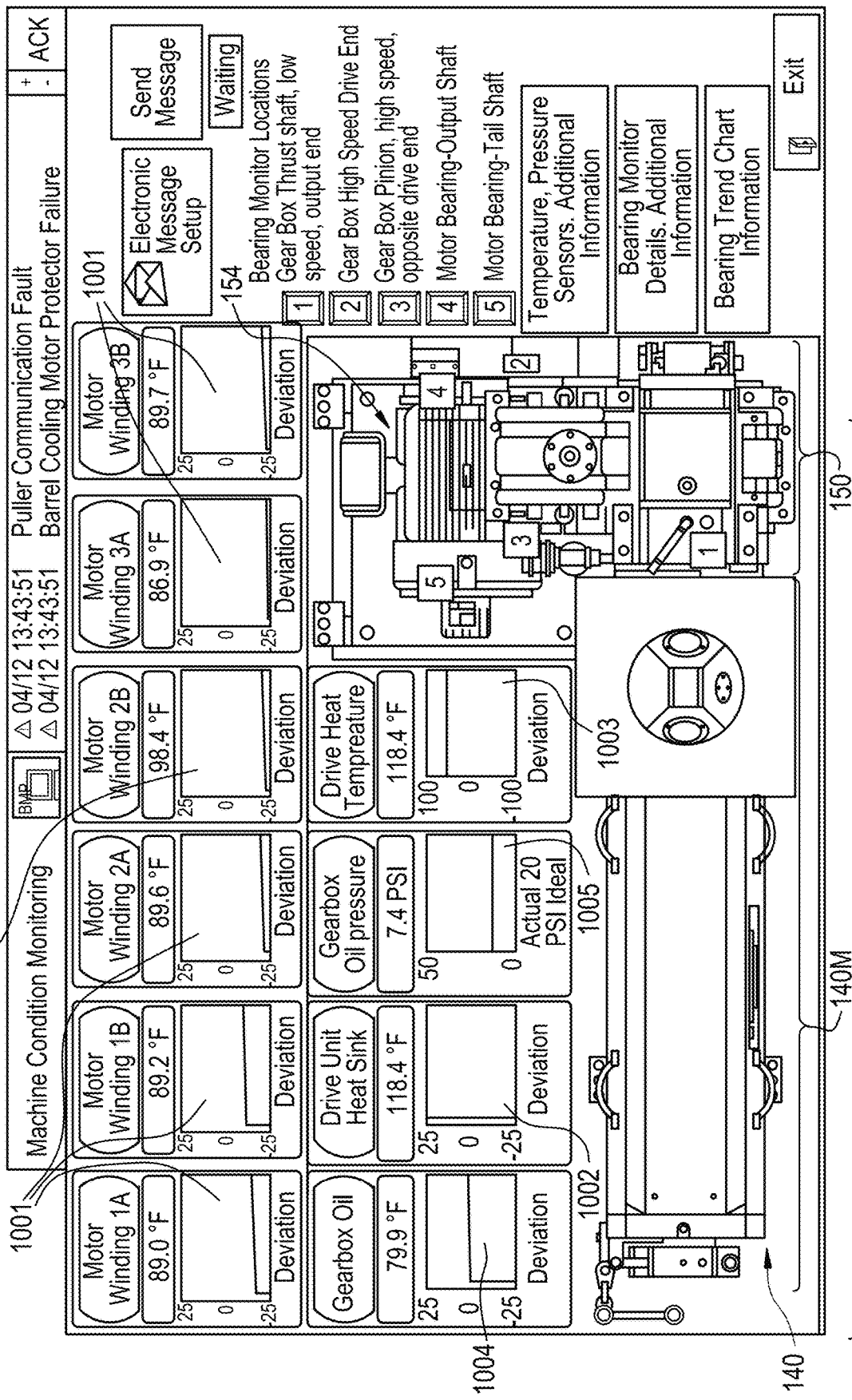

DIAGNOSTIC TROUBLESHOOTING SYSTEM FOR AN EXTRUSION SYSTEM

CROSS REFERENCE TO RELATED APPLICATIONS

The instant application is a U.S. National Stage application of and claims priority to PCT/US2019/051009, filed on Sep. 13, 2019, which is a PCT application of and claims priority to U.S. Provisional Application No. 62/730,741, filed on Sep. 13, 2018, the subject matter of both aforementioned applications are hereby incorporated by reference in their entireties.

FIELD OF THE INVENTION

The present invention relates generally to diagnostic trouble shooting system for an extrusion apparatus.

BACKGROUND OF THE INVENTION

Extrusion devices are used to melt, blend, and form materials into a desired shape. Typical extrusion devices include a rotating screw housed coaxially within a temperature controlled, cylindrically-shaped barrel. The screw rotates within the barrel and drives an extrusion material, such as plastic, through the barrel. The extrusion material is forced through a die or aperture at the end of the barrel. The speed of the screw rotation is typically controlled via a controller to obtain a predetermined flow of extruded material at an appropriate temperature.

The temperature of the extrusion material is usually controlled in the barrel to achieve a product having desired characteristics and one that has an appropriate consistency to be forced through the die. For example, the temperature within the barrel is controlled with the use of heaters (e.g., electronic coil heaters) and coolers (e.g., water or air circulating heat exchangers).

A controller receives signals from the temperature sensors positioned in and around the barrel of the extrusion apparatus at different locations along the length of the barrel. The controller determines whether the temperature of a given heat exchange zone is too cool or too hot relative to the temperature set point for that heat exchange zone. If there is a difference, the controller signals the appropriate heater or cooler to increase or decrease the heat in the particular zone.

Prior art extrusion systems are disclosed in U.S. Pat. No. 9,266,274 B2 to Christiano et al. and U.S. Pat. No. 9,782,922 B2 to Christiano et al. Referring to FIG. 1, these extrusion systems specifically disclose a plurality of heater-cooler systems 43 with a plurality of heaters in thermal communication with a barrel of an extrusion apparatus 40. As shown in FIG. 1, each of the heater-cooler systems 43 includes an intake port 55 with a blower 57 connected thereto. As shown in FIG. 2, the extrusion apparatus 40 includes a plurality of heaters 45, 46, 47.

In FIG. 3 one shroud assembly 51 is shown, for example. However, The extrusion apparatus 40 includes a plurality of the shroud assemblies 51 adjacent to one another and corresponding to each of the heater-cooler systems 43 shown in FIG. 1 As shown in FIG. 3, each of the shroud assemblies 51 has an intake port 55 and an exhaust port 56 with a blower 57 (see FIG. 1) connected to the intake port 55. The blower 57 shown in FIG. 1 delivers air to the cavity. A portion of each of the shroud assemblies 51 includes an exhaust port 56 that has a moveable flap 58F. Operation of the blower 57 shown in FIG. 1 increases the pressure in the cavity opening the flap 58F as shown in FIG. 3. When the blower 57 shown in FIG. 1 is de-energized, the flap 58F shown in FIG. 3 seals the cavity in a closed position.

The aforementioned prior art extrusion systems experience component failures that cause unexpected downtime leading to reduced productivity and profitability. Component failure in extrusion systems includes, but is not limited to, motor and gear box failures due to bearing wear, heater failure on the extrusion apparatus and downstream components, excessive wear on the screw and barrel causing processing problems and electrical component failure (e.g., motor drive control system, etc.).

CN202021800 discloses an air-cooled electromagnetic heating device for a plastic extrusion device, which includes a thermal insulation layer, an electromagnetic induction coil, and a temperature measuring element.

CN10279500 discloses a production method of a winding hose linkage production method and a device thereof, including a hose extruder, a hose freezer, a steel wire winding machine, and a tractor thereof, and other related equipment.

JP61241124 discloses a plastic molding machine such as an extruder, an injection molding machine, and a blow molding machine having a melting process of a plastic material and a control system for performing automatic diagnosis of transportation and mixing in a pool and a melting zone.

JPS6331731 discloses a method for controlling an extrusion molding machine, an injection molding machine, and a blow molding machine such as an extruder for molding a molten plastic material.

U.S. Pat. No. Re. 31,903 discloses the control of the operating temperature of an extruder barrel in a system which includes a shell surrounding the barrel and providing heat exchange elements for exchanging heat with the extruder barrel.

International Patent Application No. WO 01/58667 A1 discloses an extruder temperature controller for an extruder barrel including means for determining an actual screw speed and has means for storing a plurality of screw speeds.

U.S. Patent Application Publication No. US 2018/0180516 A1 discloses a method for real-time diagnostic equipment that generates vibration and static equipment with a plurality of sensors installed on or mounted proximate to the equipment.

U.S. Pat. No. 4,784,595 discloses an apparatus for extrusion of a thermoplastic material comprises an extruder with an extruder screw and an extruder housing with a feed opening, a feed device, a drive with a variable speed motor and a regulating device cascade for the mass temperature.

EP 2 975 480 discloses systems and methods for receiving an indication of a selection of a first piece of equipment in an industrial monitoring system. The systems and methods also include determining a first feature of interest in a plot corresponding to a first sensor. Additionally, the systems and methods include matching the first feature of interest with corresponding second features of interest in a second plot. Furthermore, the systems and methods include overlaying the first plot with the second plot based at least in part on the first feature of interest and the corresponding second feature of interest.

ES2532750A1 relates to a method using an intelligent module (e.g., a computer) permanently installed in a production tooling capable of acquisition and storage of production data and expert evaluation of results in each cycle in a learning stage that generates an expert model to evaluate each production cycle in a phase production and orders autonomous control actions necessary to the production machinery incorporating such tools.

U.S. Patent Application Publication No. US 2016/0236392 relates to a molding condition diagnostic device which can diagnose appropriateness of a preset molding condition according to a measured value detected during continuous automated operation.

Thus, there is a need for a diagnostic troubleshooting system for extrusion apparatuses that identifies component failure to address the foregoing problems.

SUMMARY OF THE INVENTION

There is disclosed herein an extrusion apparatus that includes a diagnostic system. The extrusion apparatus includes a material processing section that includes an extruder screw disposed for rotation in a barrel. A shroud assembly surrounds the barrel. The extrusion apparatus includes a temperature control system that has one or more heaters and one or more cooler systems that are in heat conductive communication with the barrel. The extrusion apparatus includes a speed control apparatus that has a drive unit that is in communication with a speed variation device. The speed variation device is coupled to the extruder screw for rotation of the extruder screw in the barrel. The extrusion apparatus includes a diagnostic system that is in communication with the material processing section and/or the speed control apparatus. The diagnostic system includes (a) one or more sensor systems in communication with the material processing section and/or the speed control apparatus; and (b) a computer processor controller in communication with the sensor systems and a computer. The computer processor controller includes a computer readable medium that employs one or more algorithms and that is executable by the computer to generate signals characterizing performance of the material processing section and/or the speed control apparatus.

In one embodiment, the signals include heater continuity diagnostic data, heater resistance diagnostic data, solenoid diagnostic data, screw vibration diagnostic data, valve diagnostic data, leakage data, flow obstruction data, thermocouple diagnostic data, blower diagnostic data, and/or cooling system diagnostic data.

In one embodiment, the signals include gear box diagnostic data, motor diagnostic data, bearing diagnostic data, motor and gearbox vibration diagnostic data, bearing diagnostic data, and/or lubrication diagnostic data.

In one embodiment, the algorithms include a predictive model configured to identify remaining life of portions of the extrusion apparatus.

In one embodiment, the extrusion apparatus includes a data storage device that is in communication with the controller. The data storage device is configured to store a history of the performance information. The algorithms include a comparison module configured to compare the performance information of a current operating configuration to the history and to generate predictive life messages and/or maintenance recommendations.

In one embodiment, a display is in communication with the controller and the display is configured to present diagnosis indicia.

In one embodiment, the sensor systems include a sensor for monitoring of the electrical current consumed by the extrusion apparatus.

In one embodiment, the sensor systems are configured to monitor the sufficiency of lubricating oil quantity in the speed control apparatus and triggers an alarm when a condition of insufficient lubricating oil occurs.

In one embodiment, the diagnostic system generates an alarm when electrical current to the drive unit is insufficient.

In one embodiment, the sensor systems include an oil filter differential pressure sensor.

In one embodiment, the sensor systems include a motion sensor that detects movement of the extrusion apparatus.

In one embodiment, the sensor systems include a sensor that measures the dimensions of product extruded from the extrusion apparatus.

In one embodiment, the controller includes a control signal generator that is in communication with and is configured for control of the material processing section and/or the speed control apparatus.

There is disclosed herein a diagnostic system for an extrusion apparatus. The diagnostic system includes a computer processor controller, a computer, and one or more sensor systems. The computer processor controller communicates with a computer and includes a computer readable medium that employs one or more algorithms. The computer executes the algorithms to generate diagnosis indicia of performance portions or the entire of the extrusion apparatus. The sensor systems communicate with and transmit signals to the controller. The sensor systems communicate with a temperature control system and/or a speed control apparatus of the extrusion apparatus. The diagnosis indicia include performance information about the temperature control system and/or the speed control apparatus.

In one embodiment, the performance information about the temperature control system includes heater continuity diagnostic data, heater resistance diagnostic data, solenoid diagnostic data, screw vibration diagnostic data, valve diagnostic data, leakage data, flow obstruction data, thermocouple diagnostic data, blower diagnostic data, and/or cooling system diagnostic data.

In one embodiment, the performance information about the speed control apparatus includes gear box diagnostic data, motor diagnostic data, bearing diagnostic data, motor and gearbox vibration diagnostic data, bearing diagnostic data, and lubrication diagnostic data.

In one embodiment, the algorithm is a predictive model configured to identify the remaining life of portions of the extrusion apparatus.

In one embodiment, the diagnostic system includes a data storage device that communicates with the controller. The data storage device stores a history of the performance information and the algorithm includes a comparison module that compares the performance information of a current operating configuration to the history in order to generate predictive life messages and maintenance recommendations.

In one embodiment, the diagnostic system includes a display that communicates with the controller. The display presents the diagnosis indicia.

In one embodiment, the controller includes a control signal generator that communicates with and controls the barrel temperature control system and/or the speed control system.

In one embodiment, the control signal generator generates control signals based on the algorithm.

In one embodiment, the sensor system includes a monitor for measuring electrical current consumed by the extrusion apparatus.

In one embodiment, the sensor systems are configured to monitor the sufficiency of lubricating oil quantity in the speed control apparatus and triggers an alarm when a condition of insufficient lubricating oil occurs.

In one embodiment, the diagnostic system generates an alarm when electrical current to the drive unit is insufficient.

In one embodiment, the sensor system includes an oil filter differential pressure sensor.

In one embodiment, the sensor system includes a motion sensor that detects movement of the extrusion apparatus.

In one embodiment, the sensor system measures the dimensions product extruded from the barrel.

In one embodiment, the diagnostic system is used on an extrusion apparatus including a barrel coupled to multiple heaters and/or coolers. A feed hopper supplies material to the barrel. A screw is rotatingly supported in the barrel and a speed variation device is coupled to the screw. A drive unit is coupled to the speed variation device.

BRIEF DESCRIPTION OF THE DRAWINGS

FIG. 11 depicts a diagnostic dashboard for the gearbox assembly according to the present disclosure; and FIG. 12 depicts a diagnostic dashboard that evaluates the measurements presented in the diagnostic dashboard of FIG. 11.

DETAILED DESCRIPTION

Figure 1:
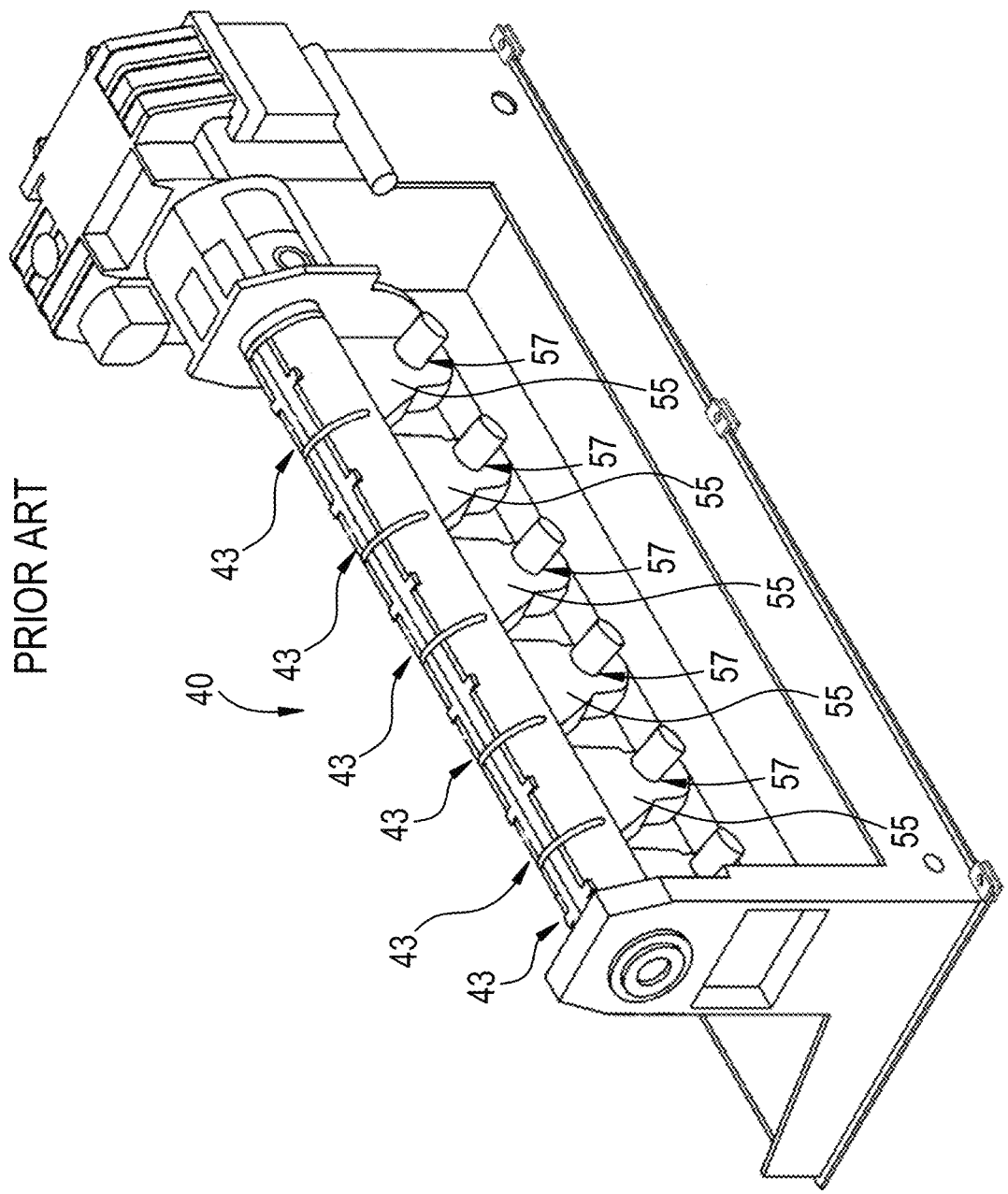
FIG. 1 is perspective view of a prior art single barrel extruder.
Figure 2:
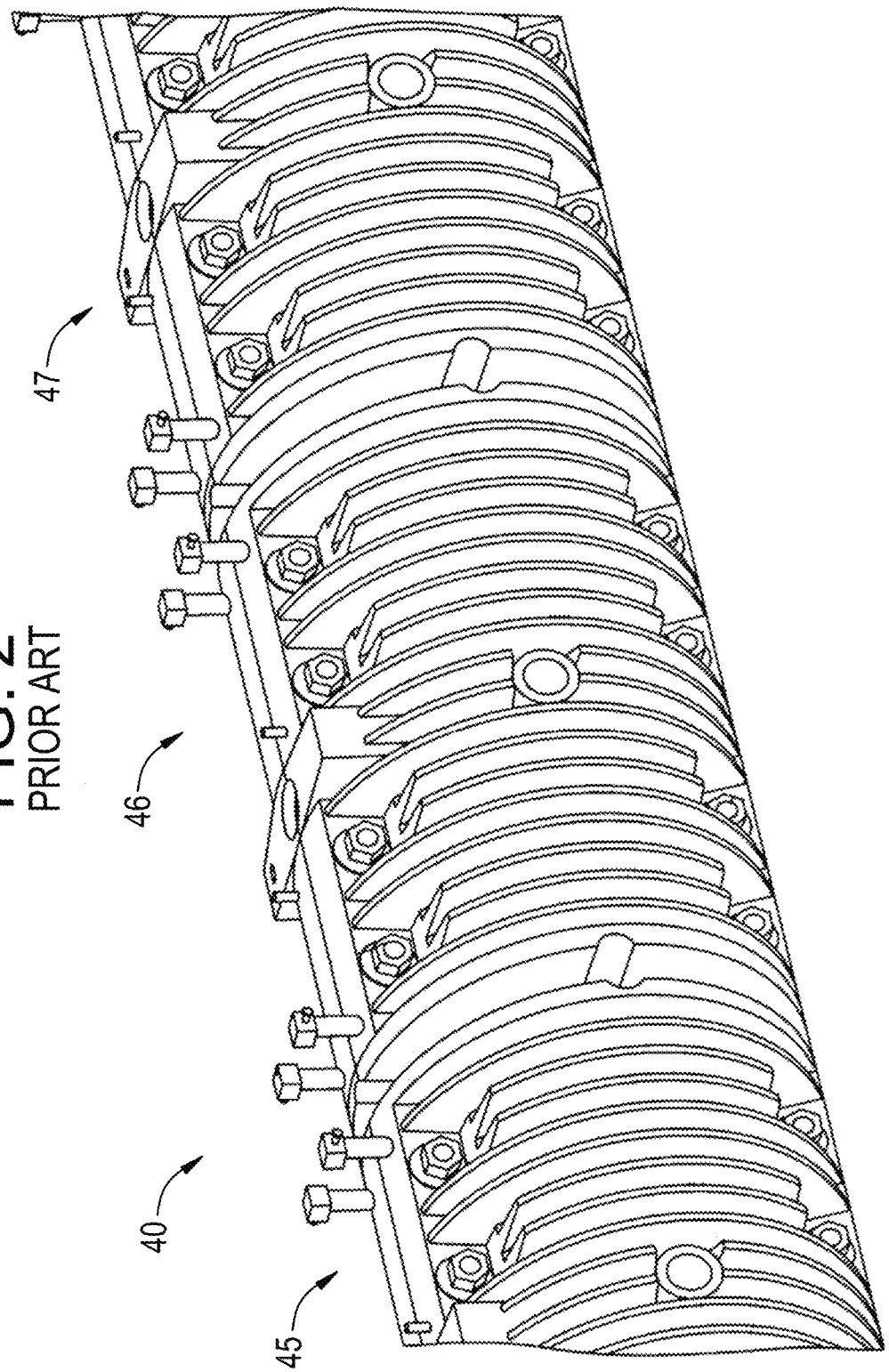
FIG. 2 is a perspective view of three heaters in thermal communication with a barrel of a prior art extruder.
Figure 3:
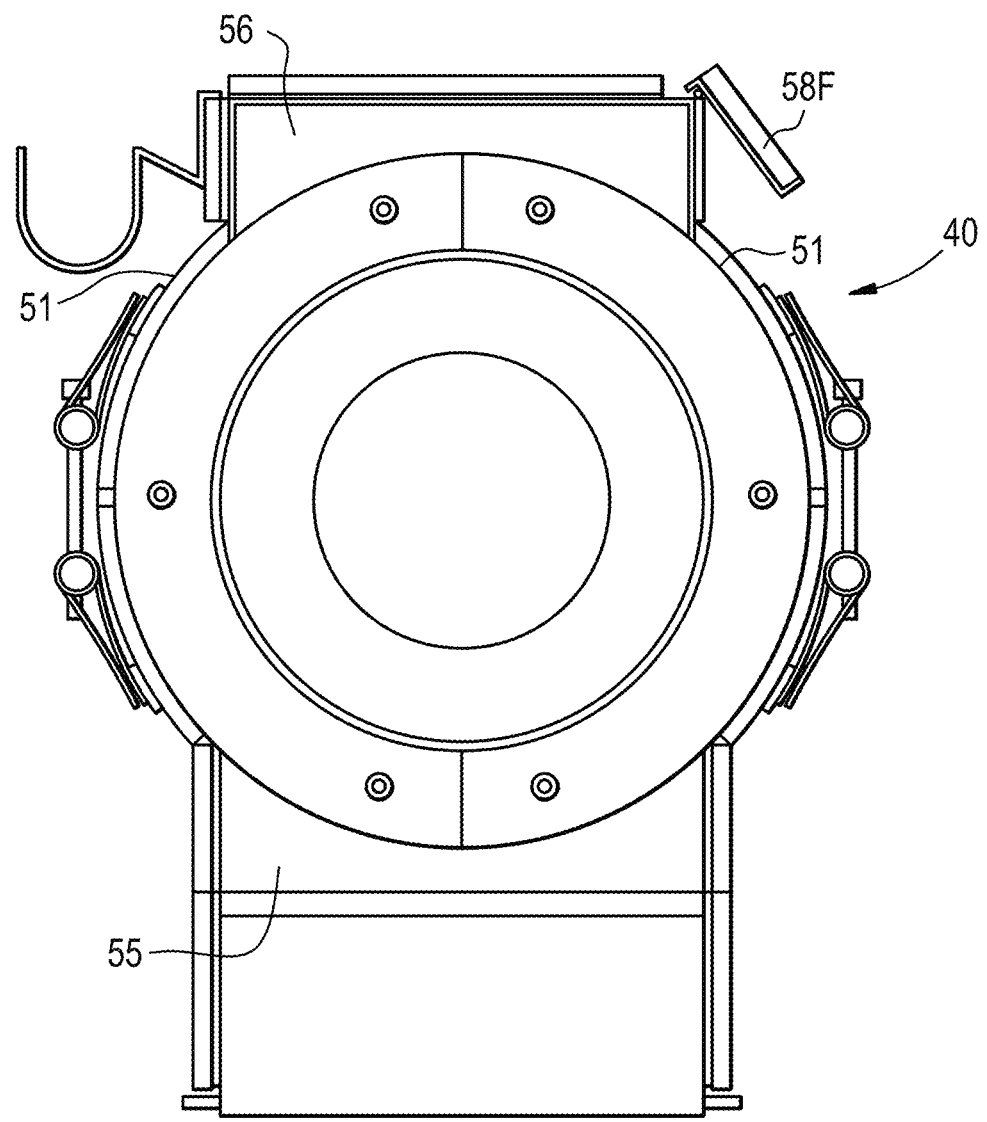
FIG. 3 is a view of a portion of a prior art heater-cooler system.
Figure 4A:
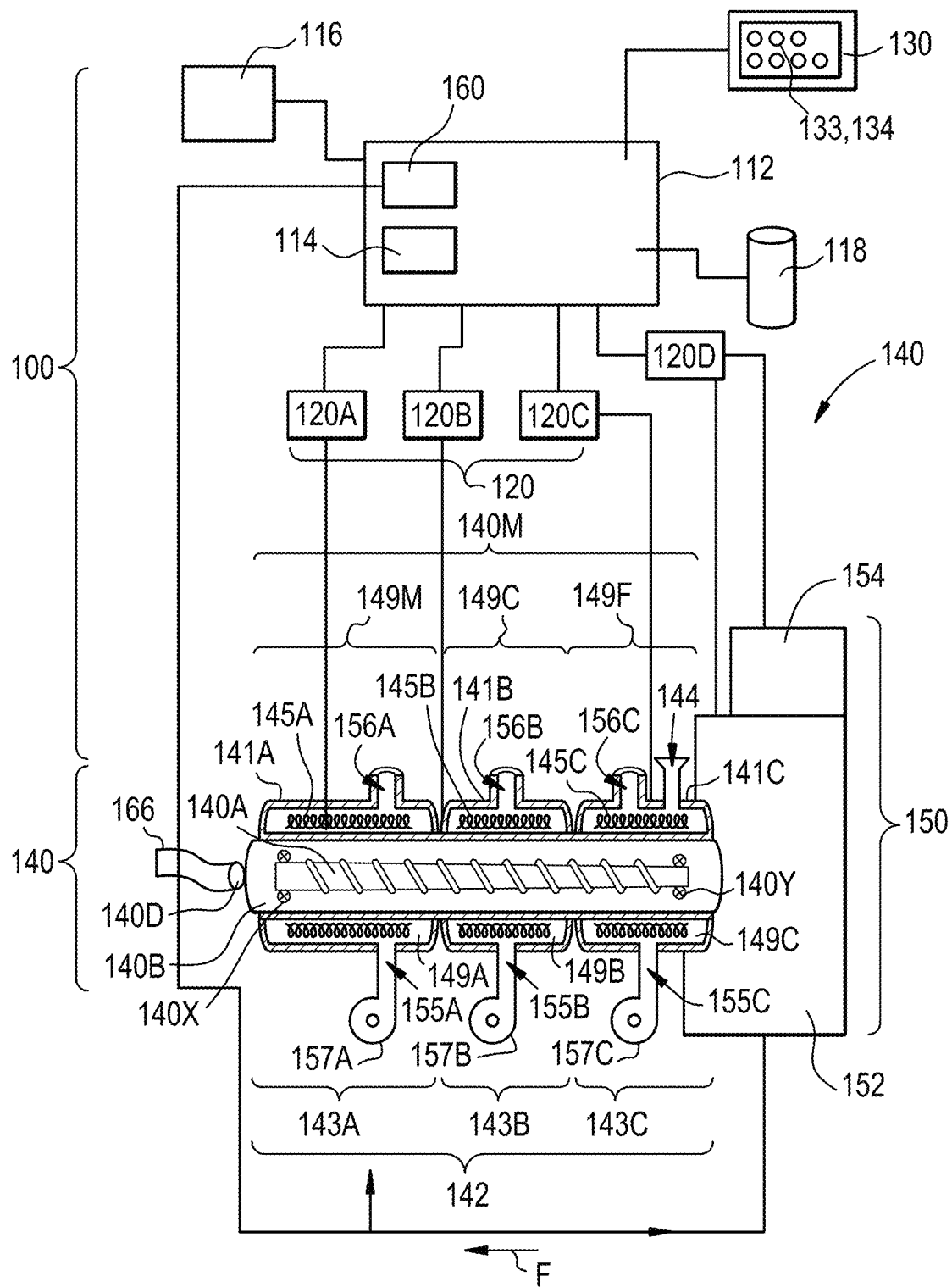
FIG. 4A is a schematic view of a diagnostic trouble shooting system for an air cooled extrusion system according to the present disclosure.

As best shown in FIG. 4A, a diagnostic system 100 is integrated into the controls of an extrusion apparatus 140. The diagnostic system 100 verifies that components of the extrusion apparatus 140 are working properly, identifies anomalous operation, diagnoses the anomalous operation and suggests actions for remedying the anomalous operation. The diagnostic system 100 is shown with four sensor systems 120A, 120B, 120C, 120D as described herein. Sensor systems 120A, 120B and 120C are collectively referred to on FIG. 4A by a bracket with element number 120. The sensor systems 120A, 120B, 120C, 120D include temperature sensors (e.g., thermocouples), vibration sensors, fluid level sensors, air flow sensors, thickness gauge sensors for measuring the thickness of extruded material, electrical current sensors, speed sensors, chemical analysis sensors (e.g., for testing the condition of oil in the speed control apparatus), electrical resistance sensors, leakage detection sensors, noise monitoring sensors, pressure sensors, displacement sensors and electrical continuity sensors. The diagnostic system applies algorithms to determine the performance of the extrusion apparatus 140, for example to determine if the components of the extrusion apparatus 140 are working within acceptable design limits. While the diagnostic system 100 is shown with four sensor systems 120A, 120B, 120C, 120D, the present invention is not limited in this regard as more or less than four sensor systems may be employed.

Figure 5:
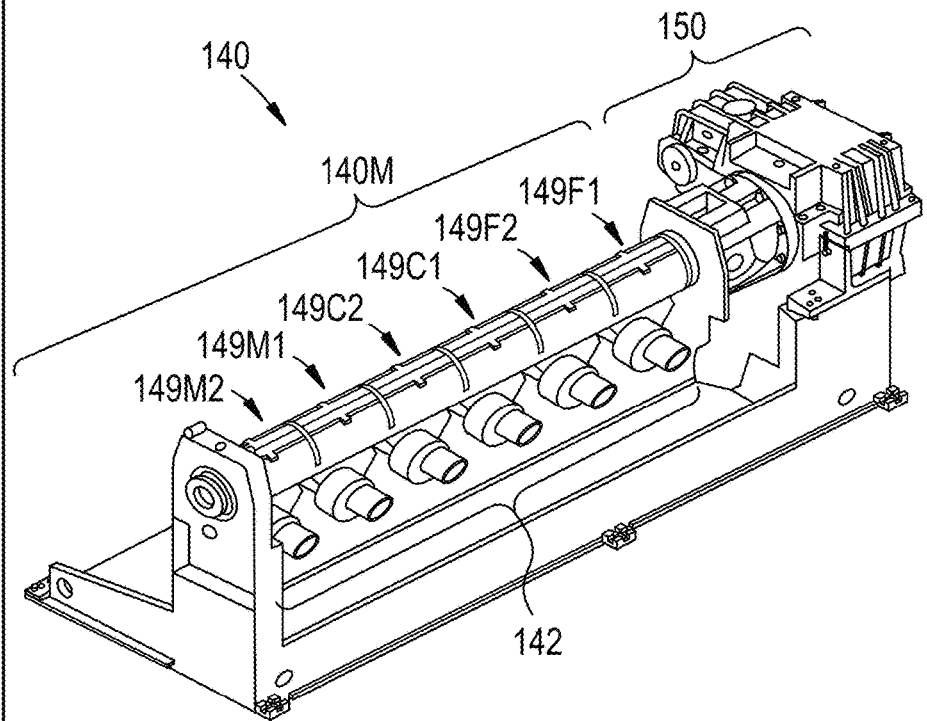
FIG. 5 depicts a heater system diagnostic dashboard according to the present disclosure.
Figure 6B:
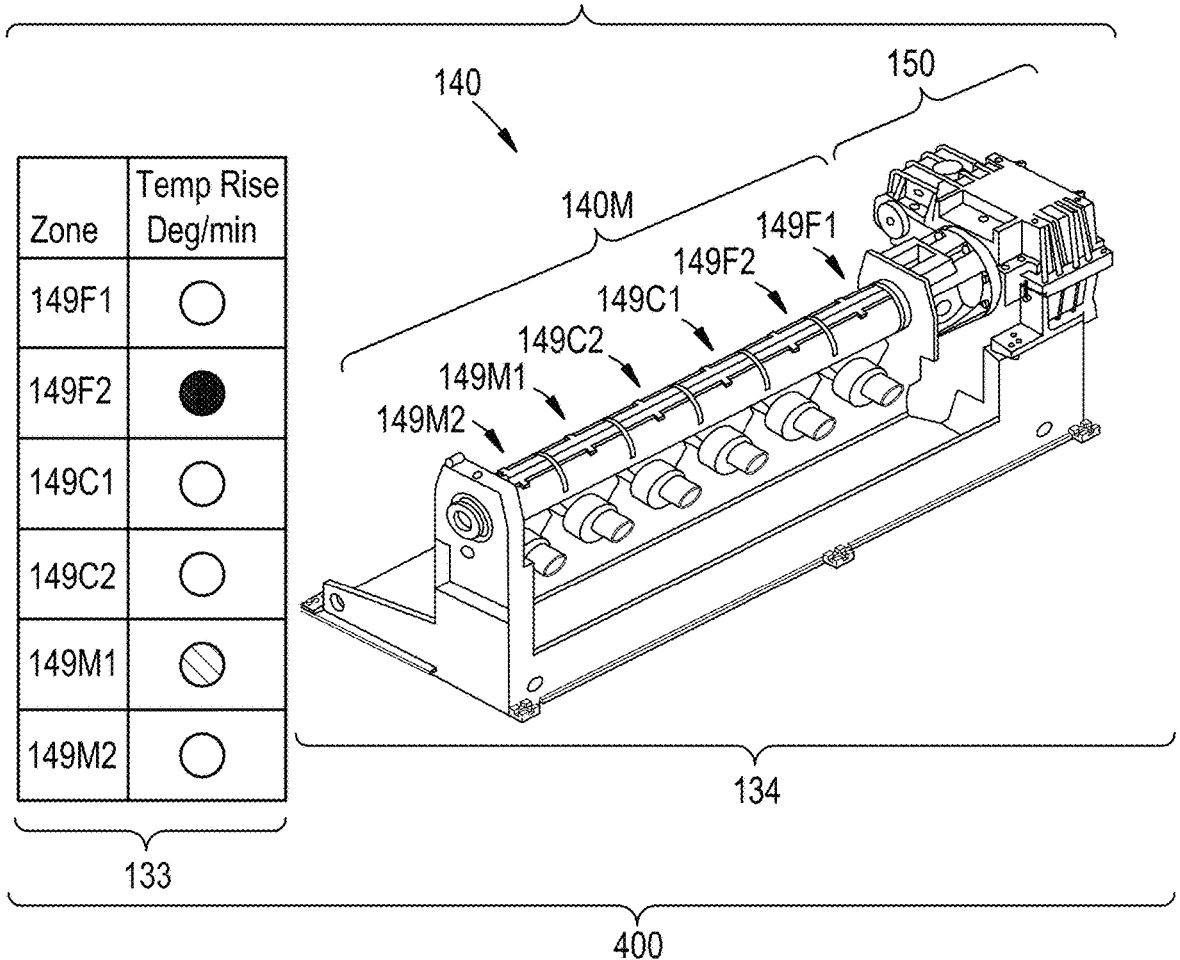
FIG. 6B depicts a diagnostic dashboard including the status of the temperature sensors according to the present disclosure.
Figure 7:
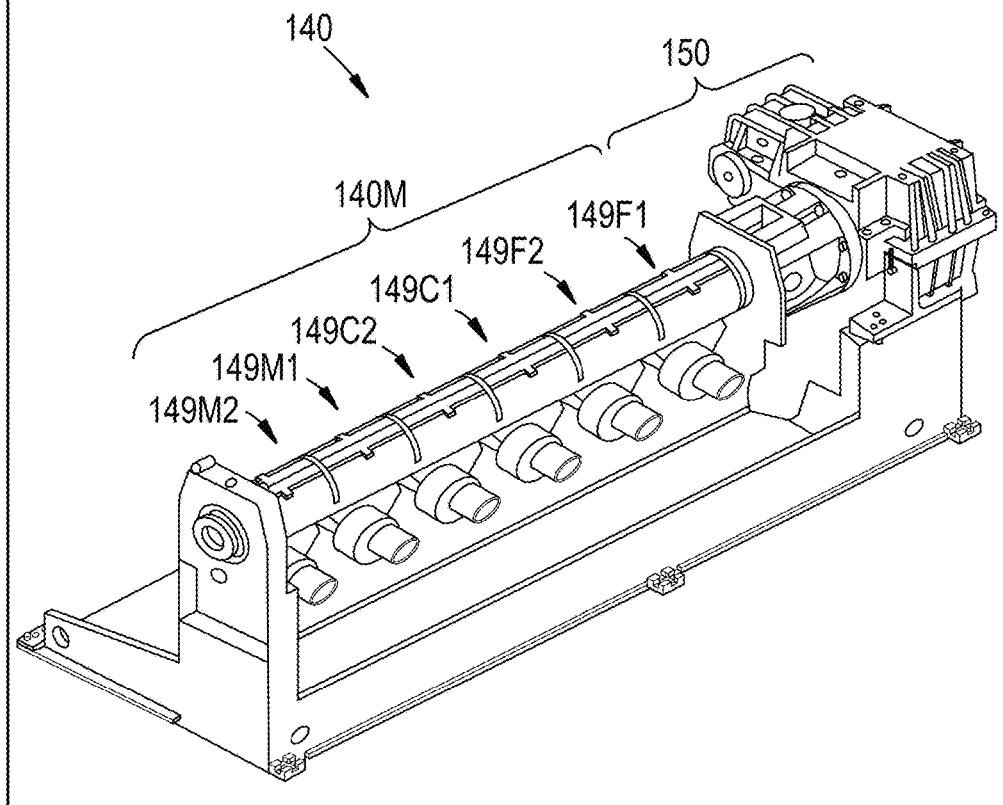
FIG. 7 depicts a diagnostic dashboard for the blowers according to the present disclosure.

As shown in FIG. 4A, the extrusion apparatus 140 includes a material processing section 140M that includes an extruder screw 140A disposed for rotation in a barrel 140B (e.g., a hollow cylindrical vessel). The extruder screw 140A is supported in the barrel 140B by bearings 140X and 140Y. The barrel 140B and s extruder crew 140A are designated into three zones, namely, (1) a feed zone 149F, (2) compression zone 149C, and (3) metering zone 149M. A hopper 144 is attached to the barrel 140B at an opening in the barrel 140B in the feed zone 149F to feed material to be extruded, such as a polymer into the barrel 140B. The material to be extruded is fed into the feed zone 149F via the hopper 144 and the material is urged through the barrel 140B by rotation of the extruder screw 140A from the feed zone 149F, to the compression zone 149C and into the metering zone 149M in the direction of the arrow F. The material is forced out of the metering zone 149M into a die 140D, by rotation of the extruder screw 140A. The material processing section 140M of the extrusion system 140 may have more than three zones, as shown in FIGS. 5, 6B and 7 wherein six zones are shown, namely, 149F1, 149F2, 149C1, 149C2, 149M1 and 149M2.

As shown in FIG. 4A, three shroud assemblies 141A, 141B and 141C surround the barrel 140B and each of the shroud assemblies 141A, 141B and 141C defines a cavity 149A, 149B and 149C located between the respective one of the shroud assemblies 141A, 141B and 141C and an exterior surface of the barrel 140B. Each of the shroud assemblies 141A, 141B and 141C has an inlet 155A, 155B and 155C and an outlet 156A, 156B and 156C, respectively. While the barrel 140B is shown having three shroud assemblies 141A, 141B and 141C and each having a respective inlet 155A, 155B and 155C and outlet 156A, 156B and 156C, the present invention is not limited in this regard as the barrel 140B may be configured with more or less than three shroud assemblies each having one or more respective inlets and outlets.

Figure 4B:
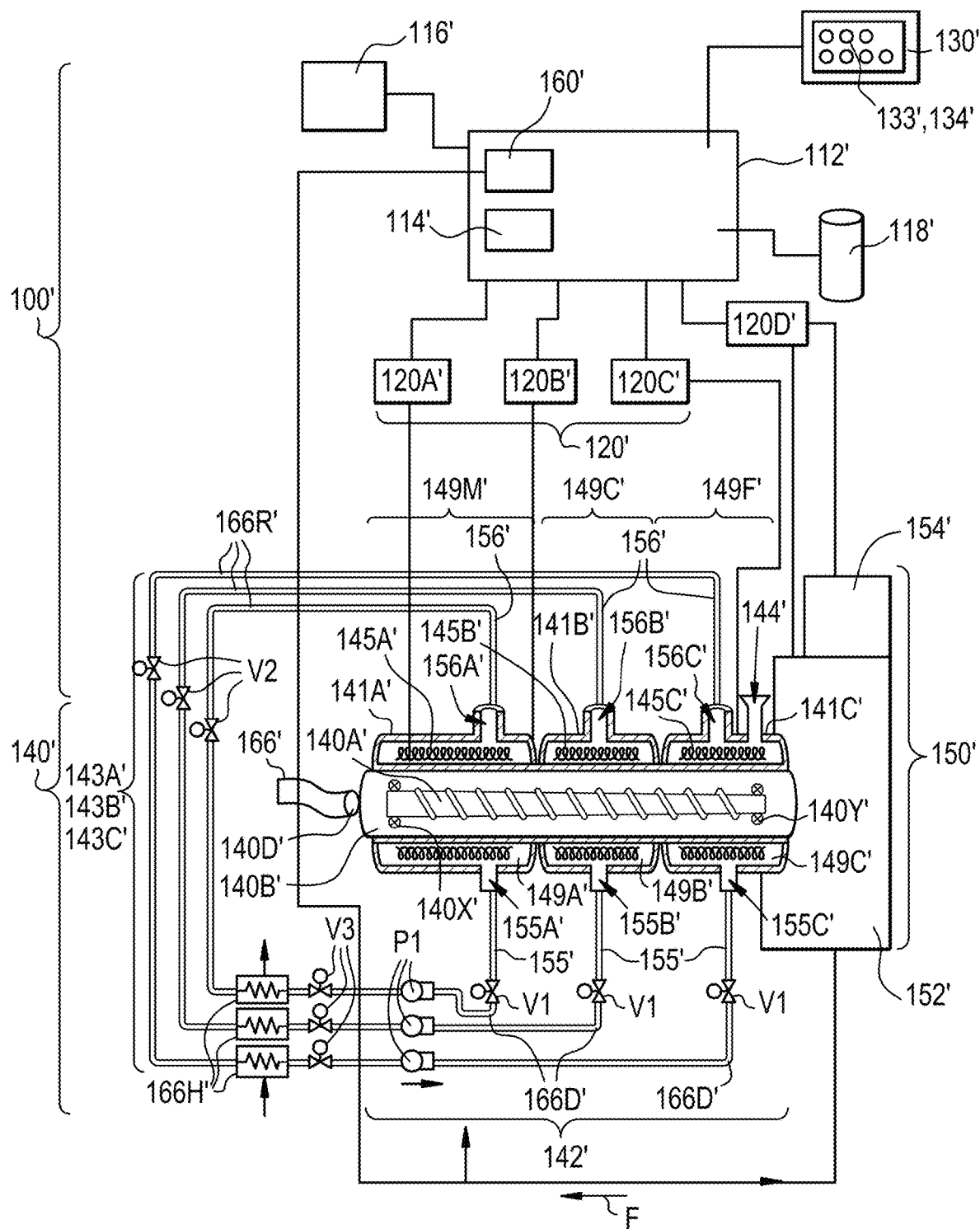
FIG. 4B is a schematic view of a diagnostic trouble shooting system for a liquid cooled extrusion system according to the present disclosure.

As shown in FIG. 4A, a temperature control system 142 controls the temperature of the barrel 140B which affects the temperature of the extruder screw 140A and material (e.g., a polymer) to be extruded that is contained in the barrel 140B. The temperature control system 142 is shown having three heaters 145A, 145B and 145C (e.g., electrical resistance heaters) that can be controlled independently from one another. The temperature control system 142 is shown with three cooler systems 143A, 143B and 143C. The cooler systems 143A, 143B and 143C and the heaters 145A, 145B and 145C are in in heat conductive communication with the barrel 140B. Each of the cooler systems 143A, 143B and 143C has blower 157A, 157B and 157C, respectively, connected to and in fluid communication with the inlet 155A, 155B and 155C, respectively. While the temperature control system 142 is shown and described as having three heaters 145A, 145B and 145C and three cooler systems 143A, 143B and 143C, the present invention is not limited in this regard as the temperature control system 142 may have more or less than three heaters and cooler systems. While the cooler systems 143A, 143B and 143C are described as having a respective one of the blowers 157A, 157B or 157C, the present invention is not limited in this regard as each the cooler systems 143A, 143B and 143C may employ more than one blower, a liquid based cooling system utilizing a closed loop flow circuit of coolant (e.g., water) with a pump and suitable valves, or combinations thereof, as shown in FIG. 4B.

As shown in FIG. 4A, the extrusion apparatus 140 includes a speed control apparatus 150 that has a drive unit 154 (e.g., motor, turbine or the like) in communication with a speed variation device 152 (e.g., a gear box). The speed variation device 152 is coupled to the extruder screw 140A for rotation of the extruder screw 140A in the barrel 140B.

As shown in FIG. 4A, a computer processor controller 112 of the diagnostic system 100 communicates with a computer 116. The computer processor controller 112 has a computer readable medium 114 that employs one or more algorithms that are executable by the computer 116. The sensor systems 120A, 120B, 120C, 120D measure parameters indicative of performance of the extrusion apparatus 140 and transmits this data to the computer processor controller 112. The computer 116 runs the algorithms to interpret the data measured by the sensor systems 120A, 120B, 120C, 120D, generate diagnosis indicia 133, 134 to evaluate the performance of portions of and the entire the extrusion apparatus 140 and to suggest remedies to anomalous operation of the extrusion apparatus 140. The sensor systems 120A, 120B, 120C, 120D measure parameters indicative of performance of individual components of the extrusion apparatus 140. A control signal generator 160 communicates with the temperature control system 142 and the speed control apparatus 150 of the extrusion apparatus 140. In one embodiment, the control signal generator 160 uses the algorithms to generate control signals that adjust the operation of the heaters 145A, 145B and 145C, the blowers 157A, 157B and 157C and the rotational speed of the extruder screw 140A via adjustment to the speed control apparatus 150, such as adjusting the speed of the drive unit 154. In one embodiment, the sensor systems 120A, 120B, 120C, 120D monitors parameters indicative of performance of the extrusion apparatus 140. For example, the sensor systems 120A, 120B and/or 120C measures the amp usage (e.g., electrical current consumption) of each zone (i.e., the feed zone 149F, the compression zone 149C and the metering zone 149M) of the extrusion apparatus 140. The sensor systems 120A, 120B and/or 120C are configured to measure amp usage of each of the heaters 145A, 145B and 145C and of each of the blowers 157A, 157B and 157C. In one embodiment, the diagnostic system 100 employs the algorithms to interpret measurements of the sensor systems 120A, 120B, 120C, 120D and to identify the operating condition as being acceptable and within design limits, trending out of design limits and outside of design limits and in need of maintenance and to suggest remedies for correcting anomalous operation of the extrusion apparatus 140.

The diagnosis indicia 133, 134, is generated by the computer readable medium 114 using the algorithms which are configured to process and analyze the parameters indicative of performance of the extrusion apparatus 140, such as performance of the temperature control system 142 and the speed control apparatus 150. The performance information about the temperature control system 142 includes, but is not limited to, heater continuity diagnostic data, heater resistance diagnostic data, solenoid diagnostic data, screw vibration diagnostic data, valve diagnostic data, leakage data, flow obstruction data, thermocouple diagnostic data, blower diagnostic data, and cooling system diagnostic data. The performance information about the speed control apparatus 150 includes, but is not limited to, gear box diagnostic data, motor diagnostic data, bearing diagnostic data, motor and gearbox vibration diagnostic data, bearing diagnostic data, oil filter pressure differential data and lubrication diagnostic data. In one embodiment, the performance information includes monitoring movement of the extrusion apparatus 140, itself. In one embodiment, the performance information includes the dimensions from a gauging system that measures the extruded material 166 during and/or after processing by the extrusion apparatus 140 and exiting the die 140D.

In the embodiment depicted in FIG. 4A, a data storage device 118 is also in communication with the computer processor controller 112. The data storage device 118 is configured to store a history of the aforementioned performance information and the algorithm includes a comparison module configured to compare the performance information of a current operating configuration to the history stored on the data storage device 118, to generate predictive life messages and maintenance recommendations. The algorithm includes a predictive model configured to identify remaining life of portions of the extrusion apparatus 140. The diagnostic checks include, but are not limited to, motor life, motor drive control life, gearbox oil life, extruder screw life, extruder barrel life, extruder heater life, extruder cooler life, line component bearing life, line component heater life, line component cooler life, line component motor and drive life, and measurement system component life (radioactive sources). The diagnostic check is also configured to compare the sensor readings and performance data to historical reference values. The diagnostic system 100' illustrated in FIG. 4B is configured similar to the diagnostic system 100 illustrated in FIG. 4A and has a data storage device 118' that functions similar to the data storage device 118 described herein with reference to FIG. 4A.

Referring to FIG. 4A, the diagnostic system 100 includes a display 130 (e.g., a video or computer screen, a cell phone device and the like) that communicates with the computer processor controller 112 to present the diagnosis indicia 133, 134. The display 130 graphically displays an alert on a dashboard that alerts an operator when corrective action needs to be taken. The alert is communicated at several levels of the organization throughout the operation of the extrusion apparatus 140, for example, (1) at the machine level, the dashboard displays on the human machine interface ("HMI") the status of components of the extrusion apparatus 140; (2) at the factory level, an alarm alerts necessary maintenance to a factory server system by sending data on a factory intranet system; and/or (3) at the enterprise level, the information is communicated using an external network via the internet (or cloud) to communicate across the enterprise. The diagnostic system 100 is configured to be operated from remote locations based on the alerts sent on the enterprise level. The diagnostic system 100' illustrated in FIG. 4B has a display 130' that is configured similar to the display 130 illustrated in FIG. 4A and described herein.

FIG. 5 depicts the indicia 133, 134 in the form of a heater system diagnostic dashboard 200 that includes a table 133 and a schematic diagram 134 of the extrusion apparatus 140 and the speed control apparatus 150. The dashboard 200 is displayed at the machine, factory, and/or enterprise level. Based on electrical and mechanical system checks, the heater continuity, heater resistance, thermocouple, and cooling sub system statuses (e.g., solenoids, blowers, valves, etc.) for each zone or barrel zone 149F1, 149F2, 149C1, 149C2, 149M1, 149M2 of temperature control system 142 of the extrusion apparatus 140, the diagnostic system 100 (see FIG. 4A, for example) displays the indicia 133, 134 as green, yellow, and/or red indicators, as described herein with respect to FIGS. 6B, 7 and 8. The diagnostic system 100 measures the electrical continuity and resistance of each heater 145A, 145B, 145C at start-up of the heaters and the algorithms compares the measured electrical continuity and resistance to reference values stored in the data storage device 118, shown in FIG. 4A, for example. In some embodiments, continuity and resistance measurements are tabulated on a dashboard for maintenance. The diagnostic system 100 employs the algorithms to detect an open circuit condition and resistivity of each heater 145A, 145B, 145C and if the measured open circuit condition and resistivity are inconsistent with predicted values, the diagnostic system 100 generates and initiates an alarm and suggests corrective actions.

The sensor systems 120A, 120B, 120C, 120D illustrated in FIG. 4A are checked for correct performance by operating various components of the extrusion apparatus 140 and checking for an expected response. For example, the heaters 145A, 145B and 145C are operated to increase in temperature and the response of the sensor systems 120A, 120B and 120C (e.g., temperature sensors) is checked to verify in indicated increase in temperature.

Referring to FIG. 4A, once the extrusion apparatus 140 has reached a designated temperature and is controlling at steady state conditions and before the extrusion system 140 is running material (i.e., the extruder screw 140A is stationary), the algorithms put or cause to put the cooler system 143A, 143B, 143C is into operation (e.g., operating the blowers 157A, 157B, 157C) and algorithm causes the diagnostic system 100 to examine the sensor system 120A, 120B and 120C response. If the temperature of the zone does not decrease in accordance with the reference value, the algorithm generates a signal to notify the operator to check the blowers 157A, 158B, 157C and to check for blockage in the coolant passages and cavities 149A, 149B, 149C and to remedy problems.

Referring to FIG. 4A, the diagnostic system 100 also initiates a pulse response to check the blowers 157A, 157B, 157C. At the operating temperature the algorithm causes the diagnostic system 100 to pulse each blower and generates signals indicative of the response of the blowers 157A, 157B, 157C. If the blowers 157A, 157B, 157C are not functioning the algorithm generates signals to alert the operator to check the continuity and to check to determine if the blower flow path is restricted, check the breaker, inspect the blower fan and/or to replace the drive unit 154.

Figure 6A:
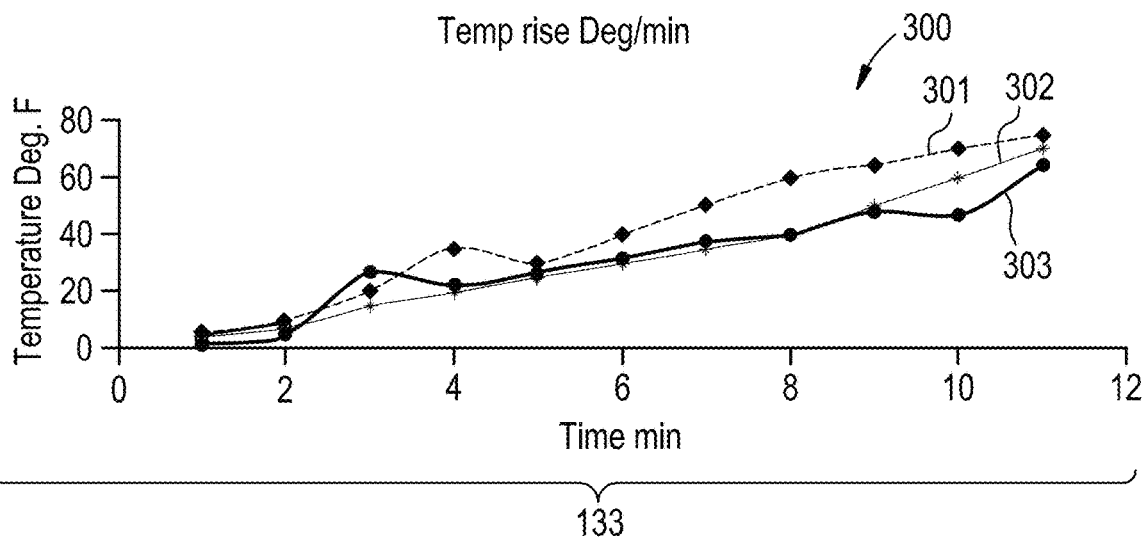
FIG. 6A is a line graph showing the temperature response recorded by the dashboard of FIG. 5 in four zones over time.

As shown in FIG. 6A, the diagnosis indicia 133 include a graph 300 displaying plots 301, 302 and 303 of the temperature as a function of time for each zone 149F, 149C, and 149M, respectively.

A dashboard 400, such as that depicted in FIG. 6B displays the indicia 133, 134 as a schematic 134 of the material processing section 140M of the extrusion apparatus 140 and the speed control apparatus 150 along with a table 133 indicating the status of the temperature change (e.g., temperature increase or decrease) as a function of time, in each zone 149F1, 149F2, 149C1, 149C2, 149M1 and 149M2 with a color coding system. For zones 149F1, 149F2, 149C1 and 149M2 the temperature increase in degrees per minute is indicated as being within the acceptable design range by a green colored dot that is illustrated in FIG. 6B by a white circle with a black circumference. For zone 149M1 the temperature increase in degrees per minute is indicated as being within marginal or trending out of design range by a yellow colored dot that is illustrated in FIG. 6B as a circle with cross hatching with a black circumference. For zone 149C2 the temperature increase in degrees per minute is indicated as being outside of design range by a red colored dot that is illustrated in FIG. 6B as a solid black circle. The algorithm includes logic to detect, diagnose and report anomalous temperatures or rates of increase in temperature. If the sensor systems 120A, 120B, 120C, 120D detect an anomalous temperature, for example greater than 2000° F., the algorithm generates an alarm indicating a potential broken temperature sensor and recommending replacement of a temperature sensor in one or more of the sensor systems 120A, 120B, 120C, 120D, is necessary. If the sensor systems 120A, 120B, 120C, 120D detect an anomalous temperature, for example ambient temperature (e.g., 80 degrees Fahrenheit), the algorithm generates an action to check for electrical continuity, generates an alarm indicating a potential electrical short circuit in the temperature sensor and recommending replacement of a temperature sensor in one or more of the sensor systems 120A, 120B, 120C, 120D.

The algorithm causes a check of the electrical continuity, amp load (e.g., electrical current consumption) and resistivity of the heaters 145A, 145B, 145C and determines whether the continuity, amp load and resistivity are within the design range. The algorithm indicates that the operating condition of the heaters 145A, 145B, 145C (e.g., within or outside of design range). If the continuity, amp load and resistivity is confirmed, and the rate of heating is greater than a reference value, then the algorithm will report the condition of the heaters 145A, 145B and 145C to an operator. This report to the operator is configured to occur at the machine level, to the intranet in the factory and to the enterprise level via the internet cloud.

As shown in FIG. 4B, the diagnostic system 100' is shown with four sensor systems 120A', 120B', 120C', 120D' as described herein. Sensor systems 120A', 120B' and 120C' are collectively referred to on FIG. 4B by a bracket with element number 120'. The sensor systems 120A, 120B, 120C, 120D include temperature sensors (e.g., thermocouples), vibration sensors, fluid level sensors, air flow sensors, thickness gauge sensors for measuring the thickness of extruded material, electrical current sensors, speed sensors, chemical analysis sensors (e.g., for testing the condition of oil in the speed control apparatus), electrical resistance sensors, leakage detection sensors, noise monitoring sensors, pressure sensors, displacement sensors and electrical continuity sensors. The diagnostic system applies algorithms to determine the performance of the extrusion apparatus 140', for example to determine if the components of the extrusion apparatus 140 are working within acceptable design limits.

As shown in FIG. 4B, a computer processor controller 112' of the diagnostic system 100 communicates with a computer 116'. The computer processor controller 112' has a computer readable medium 114' that employs one or more algorithms that are executable by the computer 116'. The sensor systems 120A', 120B', 120C', 120D' measure parameters indicative of performance of the extrusion apparatus 140' and transmits this data to the computer processor controller 112'. The computer 116' runs the algorithms to interpret the data measured by the sensor systems 120A', 120B', 120C', 120D', generate diagnosis indicia 133', 134' to evaluate the performance of portions of and the entire the extrusion apparatus 140' and to suggest remedies to anomalous operation of the extrusion apparatus 140'. The sensor systems 120A', 120B', 120C', 120D' measure parameters indicative of performance of individual components of the extrusion apparatus 140'. A control signal generator 160' communicates with the temperature control system 142' and the speed control apparatus 150' of the extrusion apparatus 140'.

As shown in FIG. 4B, the barrel 140B' and extruder screw 140A' are designated into three zones, namely, (1) a feed zone 149F', (2) compression zone 149C', and (3) metering zone 149M'. A hopper 144' is attached to the barrel 140B' at an opening in the barrel 140B' in the feed zone 149F' to feed material to be extruded, such as a polymer into the barrel 140B' and through the barrel 140B' in the direction of the arrow F. The extrusion apparatus 140' includes three shroud assemblies 141A', 141B' and 141C' surround the barrel 140B' and each of the shroud assemblies 141A', 141B' and 141C' defines a cavity 149A', 149B' and 149C' located between the respective one of the shroud assemblies 141A', 141B' and 141C' and an exterior surface of the barrel 140B'. The extruder screw 140A' is rotationally supported by bearings 140X' and 140Y'. Extruded material 166' exits that barrel 140B at the die 140D'. The extrusion apparatus 140' employs a temperature control system 142' that has a three liquid based cooler systems 143A', 143B' and 143C' that circulates a liquid coolant therethrough. The liquid based cooler system 143A' is a closed loop system having a circulation pump P1 and a pump discharge line 166D' in fluid communication with the cavity 149A' via piping 155' and the inlet 155A'. A valve and actuator assembly V1 (e.g., a solenoid valve or throttle valve) is located in the discharge line 166D'. A return line 166R' is in fluid communication with the cavity 149A' via the outlet 156A'. The return line 166R' is in fluid communication with a heat exchanger 166H' via piping 156', for example, a tube side of the heat exchanger 166H'. A heat removal medium (e.g., air) is forced through the heat exchanger 166H' to reduce the temperature of the coolant flowing therethrough. Valve and actuator assemblies V2 and V3 (e.g., solenoid valve, isolation valve or shut off valve) are located upstream and downstream of the heat exchanger 166H', respectively. The heat exchanger 166H' is in fluid communication with the inlet to the pump 166P. The liquid based cooler systems 143B' and 143C' are configured similar to the liquid based cooler system 143A', for example via the pumps P1, valves V1, V2, and V3; the respective cavities 149B' and 140C' and the respective inlets 155B' and 155C', respective outlets 156B' and 156C' and respective piping 155' and 156'.

As shown in FIG. 4B, the extrusion apparatus 140' includes a speed control apparatus 150' that has a drive unit 154' (e.g., motor, turbine or the like) in communication with a speed variation device 152' (e.g., a gear box). The speed variation device 152' is coupled to the extruder screw 140A' for rotation of the extruder screw 140A' in the barrel 140B'.

Referring to FIG. 4B, the diagnostic system 100' utilizes the algorithms to conduct a check of the valve and actuator assemblies V1, V2 and V3, for example, by initiating a pulse check (e.g., an electrical pulse) to the actuators of the valves V1, V2 and V3, once the heater 145A' 145B' and 145C' have reached a predetermined operating temperature. If the temperature increase over time is lower than expected, if the temperature never reaches a set point, or if there is a high demand during a no load condition the valves V1, V2 and/or V3 the algorithm identifies that one or more of the valves V1, V2 V3 are leaking thereby causing unintended cooling of the barrel 140B. If there is no response to the pulse check the algorithm identifies that one or more of the valves V1, V2, V3 are closed or there may be a blockage in the cooling passages, resulting in insufficient cooling. At steady state operation, before processing material (at zero screw speed), if the algorithm determines that the amp load (e.g., electrical current consumption) and/or demand on the heaters 145A, 145B and 145C are greater than a reference value, the algorithm indicates that one or more of the valves V1, V2 and V2 may be leaking and initiates diagnostic checks of the operation of the valves V1, V2 and V3.

Referring to FIG. 4B, once the extrusion apparatus 140' has reached a designated temperature and is controlling at steady state conditions and before the extrusion system 140' is running material (i.e., the extruder screw 140A' is stationary), the algorithms put or cause to put the cooler system 143A', 143B', 143C' is into operation (e.g., opening the valves V1, V2 and V3 and running the pump 166P') and algorithm causes the diagnostic system 100 to examine the sensor system 120A, 120B and 120C response. If the temperature of the zone does not decrease in accordance with the reference value, the algorithm generates a signal to notify the operator to check the valves V1, V2, V3 and the pump 166P' and to check for blockage in the coolant passages and cavities 149A, 149B, 149C and to remedy problems such as inadvertently open or closed valves V1, V2 or V3 or to generate signals to replace components (e.g., the valves V1, V2, V3) that experience flow obstructions and/or blockage.

FIG. 7 illustrates the indicia 133, 134 as a dashboard 500 that includes a schematic 134 of the extrusion apparatus 140 along with a table 133 indicating the status of the extrusion apparatus 140. The dashboard 500 is generated by the algorithm based upon the checks of electrical continuity and electrical resistance of the heaters (e.g., heaters 145A, 145B, 145C); the checks of the sensor systems 120A, 120B, 120C; and the checks of the cooler systems 143A, 143B, 143C, shown in FIG. 4A. The dashboard includes a schematic 134 of the extrusion apparatus 140 along with a table 133 indicating heater continuity and heater resistance (e.g., the status of the heaters 145A, 145B, 145C shown in FIG. 4A), thermocouple data (e.g., information regarding the sensor systems 120A, 120B, 120C for the material processing section 140M and sensor system 120D for the speed control apparatus 150, shown in FIG. 4A) and cooling sub system data (status of the cooler systems 143A, 143B, 143C shown in FIG. 4A), with a color coding system. Acceptable values that are within a design range are indicated by a green colored dot that is illustrated in FIG. 7 by an white circle with a black circumference; marginal or trending out of design range values are designated by a yellow colored dot that is illustrated in FIG. 7 as a circle with cross hatching with a black circumference; and values that are outside of the design range are designated by a red colored dot that is illustrated in FIG. 7 as a solid black circle.

Figure 8:
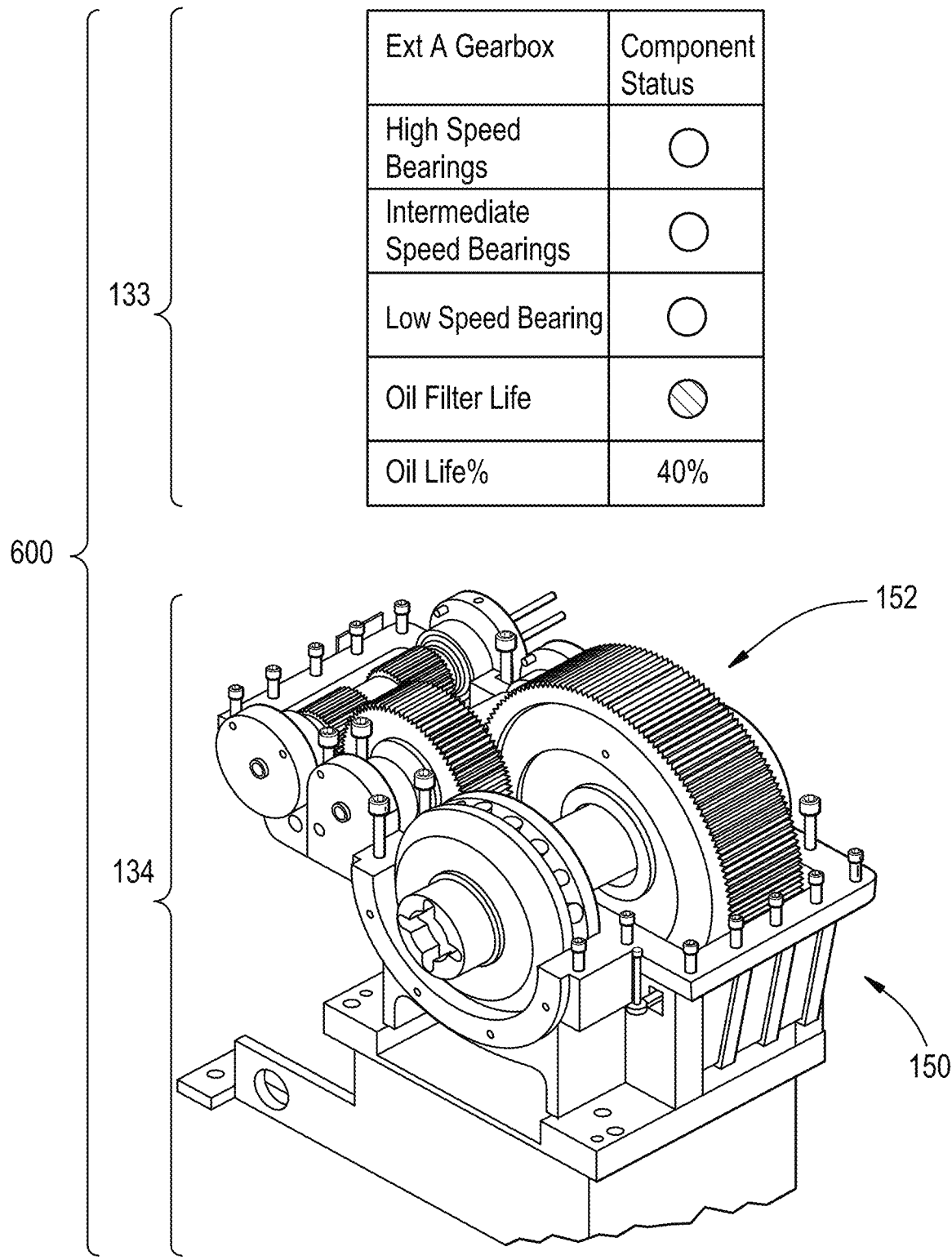
FIG. 8 depicts a diagnostic dashboard for the gearbox assembly according to the present disclosure.

As shown in FIG. 8, the algorithms cause the diagnostic system 100 shown and described with reference to FIG. 4A to monitor mechanical and electrical components of the extrusion apparatus 140 to measure performance of the bearings, motors and electrical sub system devices. The algorithm compares measured performance parameters to historical values or interpreted based on predictive models to estimate the life of the components (e.g., bearings) as a function of operating conditions and operating hours. The algorithm utilizes the following equation:

$$\text{Bearing life} = f(\text{operating conditions}, \text{operating hours})$$

FIG. 8 depicts the indicia 133, 134 as a dashboard 600 that is created by the diagnostic system 100 shown and described with reference to FIG. 4A. The dashboard 600 includes a schematic diagram 134 of the speed control apparatus 150 shown in cut away view and a table 133 that includes status of components of the speed variation device 152 including status of the high speed, intermediate, low speed thrust bearings and oil and oil filter life. Oil filter and oil life are predicted by the algorithms based on historical data or other analysis.

Figure 9:
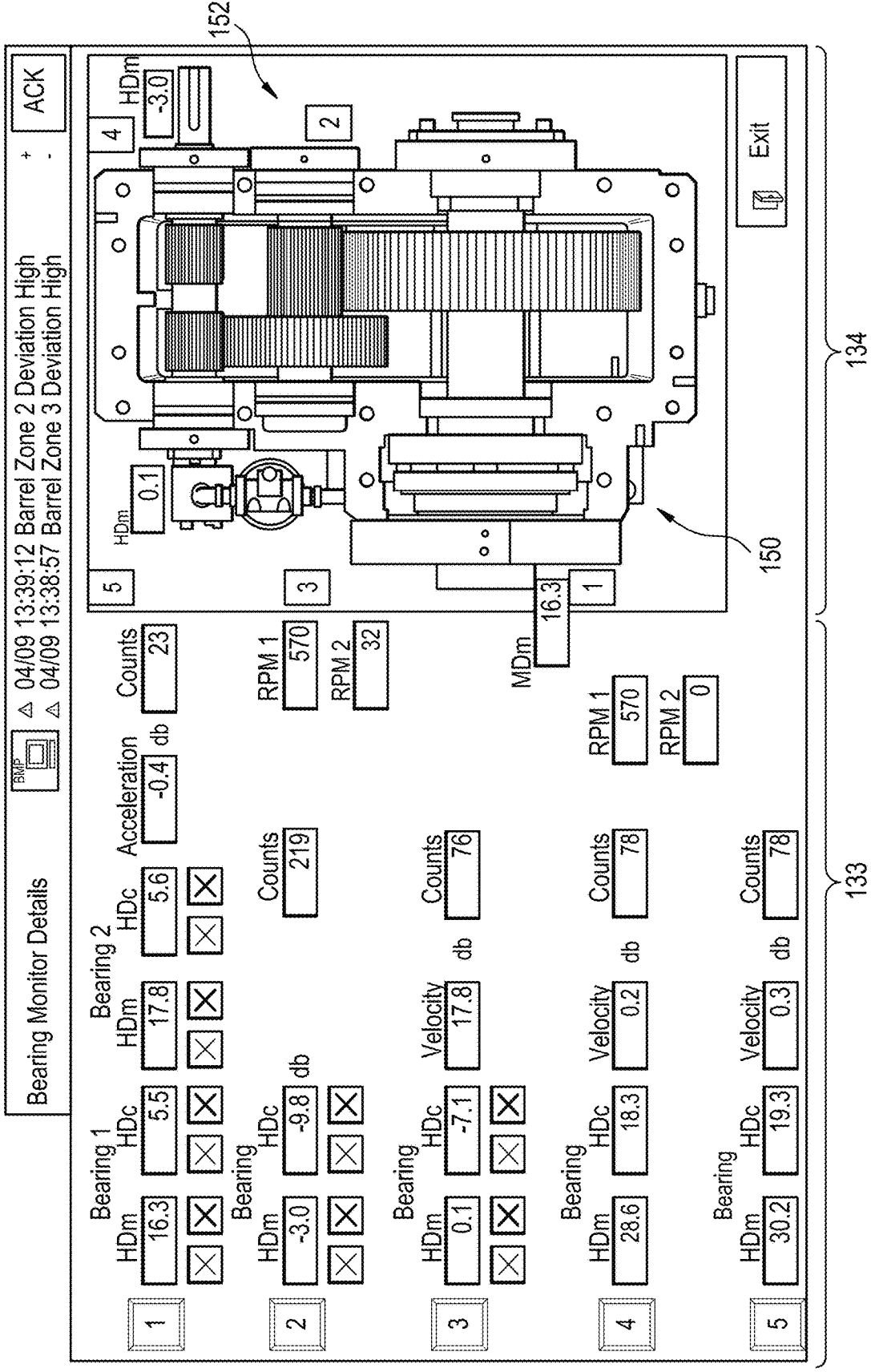
FIG. 9 depicts a diagnostic dashboard that includes bearing measurements according to the present disclosure.

The diagnostic system 100 shown and described with reference to FIG. 4A employs vibration sensors to measure performance status of the bearings in the speed control apparatus 150 of the extrusion apparatus 140. As shown in FIG. 9, the indicia 133, 134 are shown in the form of a dashboard 700 depicting a table 133 of the measured values of the vibration sensors along with a cut away image 134 of the speed variation device 152 of the speed control apparatus 150. The table 133 illustrated in FIG. 9, shows the values of the vibration measurements during operation from the speed control apparatus 150. The sensor system 120D shown in FIG. 4A measures vibration levels on the speed control apparatus 150 and stores the values at the machine, factory and/or enterprise level. The values are tracked by the diagnostic system 100 shown and described with reference to FIG. 4A and the algorithms compare the measured values to historical values and to predictive values generated from other algorithms based on the operating conditions and hours of operation.

Figure 10:
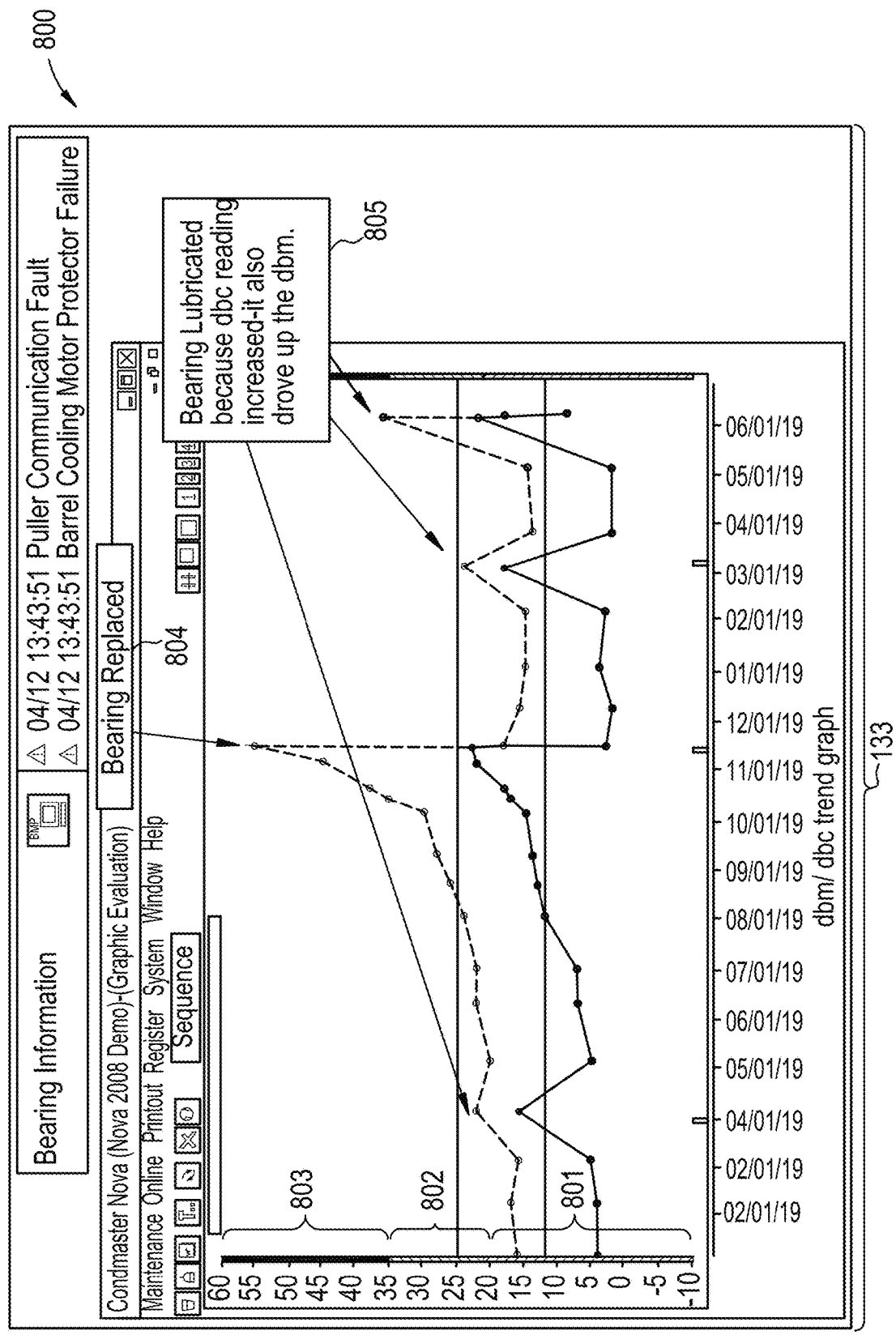
FIG. 10 is a histogram showing the bearing measurements recorded by the diagnostic dashboard of FIG. 9 with status indicators.

As shown in FIG. 10 the indicia 133 is shown in the form of a graph 800 showing the historical data plotted in a histogram form that is generated by the diagnostic system 100 shown and described with reference to FIG. 4A. The left or y-axis is color coded showing a first color (e.g., green) for the acceptable range 801, a second color (e.g., yellow) for the warning range 802, and a third color (e.g., red) for an urgent alarm range 803. If the bearing is in the urgent alarm range 803, the diagnostic system 100 shown and described with reference to FIG. 4A generates signals to alert the operator that action needs to be taken to replace 804 or refurbish 805 the bearings.

As shown in FIG. 11, the indicia 133 is in the form of a dashboard 900 that is generated by the algorithms. The dashboard 900 displays oil temperature and pressure 901, 902 in the speed control apparatus 150, temperatures 903 in the drive unit 154 (see FIG. 4A) (e.g., temperatures of various motor windings and heat sink), life elapsed or remaining 904 of the drive unit 154 and hours of operation 906 and number of starts 905 of the speed control apparatus 152 (see FIG. 4A) including the drive unit 154 and the speed variation device 152. Each value is stored in the data storage device 118 (see FIG. 4A) and compared to reference values by the algorithms. The data is used in the algorithms to estimate the life of the speed control apparatus 150 and sends an alarm to replace the components before a failure occurs.

As shown in FIG. 12, the indicia 133 is depicted in the form of a dashboard 1000 that is generated by the algorithms. The dashboard 1000 includes a schematic top view of the extrusion apparatus 140 including the material processing section 140M and the speed control apparatus 150 that displays the deviation of expected values of temperatures measured in the drive unit 154 (e.g., temperatures 1001 of various motor windings and heat sink) compared to expected values, deviation of temperatures 1002 measured in the drive unit 154 compared to expected values, deviation of temperatures 1003, 1004 measured in the speed variation device 152 (e.g., gear box) and pressure 1005 in the speed variation device 152, compared to expected values. The algorithms of the diagnostic system 100 generate an alarm when insufficient motor amperage is detected or when other mechanical or electrical systems are not performing properly.

Wear of the extruder screw 140A and the barrel 140B is also evaluated by the diagnostic system 100. In one embodiment, the algorithms calculate life of the screw using the following equation:

$$\% \text{ Screw life} = f(\text{materials of construction, operating conditions, materials processed, operating time})$$

In another embodiment, the algorithm calculates screw wear using historical reference values. The algorithm recognizes that as the extruder screw 140A wears, the output (e.g., lb/hr-rpm) of the extrusion apparatus 140 decreases at a given rotational speed and compares that output to a reference value when the extrusion apparatus 140 was new. The algorithm causes the output to be measured periodically, stored in the data storage device 118 and compared to the reference value. The output is communicated by the diagnostic system at the machine, factory and/or enterprise levels. The diagnostic system 100 is configured to transmit an alarm to the operator indicating when maintenance or replacement of the extruder screw 140A is necessary.

In one embodiment, the algorithms calculate the life of the barrel 140B using the following equation:

$$\% \text{ barrel life} = f(\text{materials of construction, operating conditions, materials process, operating time})$$

In another embodiment, the wear of the barrel 140B is evaluated by the algorithms using historical values. The algorithms recognize that as the barrel 140B wears, the output of the extrusion apparatus 140 decreases at a given rotational speed. The algorithm causes the output to be measured periodically, stored in the data storage device 118 and compared to the reference value. The output is communicated by the diagnostic system at the machine, factory and/or enterprise levels. The diagnostic system 100 is configured to transmit an alarm to the operator indicating when maintenance or replacement of the barrel 140B is necessary.

In one embodiment diagnostic system causes the sensor system 120D to monitor the presence (e.g., level) and/or quality of lube oil in the speed variation device 152. The computer processor controller 112 interprets the measurement of the sensor system 120D and indicates the status to the operator. In one embodiment, the diagnostic system 100 generates an alarm at the machine, factory, and/or enterprise level to indicate insufficient presence of lube oil.

Although the present invention has been disclosed and described with reference to certain embodiments thereof, it should be noted that other variations and modifications may be made, and it is intended that the following claims cover the variations and modifications within the true scope of the invention.

What is claimed is:

1. An extrusion apparatus having a diagnostic system, the extrusion apparatus comprising:
   a material processing section comprising an extruder screw disposed for rotation in a barrel, a temperature control system comprising at least one heater and at least one cooler system in thermal communication with the barrel;
   a speed control apparatus comprising a drive unit in communication with a speed variation device, the speed variation device being coupled to the extruder screw for rotation of the extruder screw; characterized in that:

the diagnostic system in communication with the material processing section and the speed control apparatus, the diagnostic system configured to verify operation of the extrusion apparatus within design limits, identify and diagnose anomalous operation of the extrusion apparatus and suggest remedies for the anomalous operation, the diagnostic system comprising:

(a) a first sensor system in communication with the material processing section, the first sensor system configured to measure operating performance of the material processing section during operation thereof and during processing of material to be extruded and a second sensor system in communication with the speed control apparatus, the second sensor system being configured to measure operating performance of the speed control apparatus during operation thereof and during processing of the material to be extruded and (b) a computer processor controller in communication with the first sensor system and the second sensor system and a computer, the computer processor controller comprising a computer readable medium that employs at least one algorithm and that is executable by the computer to generate signals characterizing the operating performance of the material processing section and the operating performance of the speed control apparatus;

(c) a data storage device in communication with the controller, the data storage device being configured to store a history of operating performance information, the at least one algorithm comprising a comparison module configured to generate comparisons of the operating performance information of the material processing section and the operating performance of the speed control apparatus of a current operating configuration to the history of operating performance information;

wherein the at least one algorithm comprises a predictive model configured to use the current operating configurations to identify maintenance recommendations of the barrel, the screw and the speed control apparatus and to calculate the remaining life of the screw and the barrel based upon the comparisons of the operating performance of the material processing section and the operating performance of the speed control apparatus of the current operating configuration to the history of operating performance information and wherein the predictive model is configured to calculate the remaining life of the screw and the barrel based upon material construction of the screw and barrel, operating conditions, materials processed, extruder output and operating time.

2. The extrusion apparatus of claim 1, wherein the signals comprise:
(a) at least one of heater continuity diagnostic data, heater resistance diagnostic data, solenoid diagnostic data, screw vibration diagnostic data, valve diagnostic data, leakage data, flow obstruction data, thermocouple diagnostic data, blower diagnostic data, and cooling system diagnostic data; and
(b) at least one of gear box diagnostic data, motor diagnostic data, bearing diagnostic data, motor and gearbox vibration diagnostic data, and lubrication diagnostic data.

3. The extrusion apparatus of claim 1, further comprising a display in communication with the controller, the display being configured with an algorithm generated dashboard, wherein the display is configured to present diagnosis indicia in the form of deviations from expected values in the dashboard.

4. The extrusion apparatus of claim 1, wherein the at least one sensor system further comprises a monitor of the zone amp usage.

5. The extrusion apparatus of claim 1 wherein the at least one sensor system is configured to monitor the sufficiency of lubricating oil quantity in the speed control apparatus and triggers an alarm when a condition of insufficient lubricating oil occurs.

6. The extrusion apparatus of claim 1, wherein the diagnostic system is configured to generate an alarm when electrical current to the drive unit is insufficient.

7. The extrusion apparatus of claim 1, wherein the at least one sensor system further comprises an oil filter differential pressure sensor.

8. The extrusion apparatus of claim 1, wherein the at least one sensor system further comprises a motion sensor that detects movement of the extrusion apparatus.

9. The extrusion apparatus of claim 1, wherein the at least one sensor system further comprises a sensor configured to measure dimensions of product extruded from the extrusion apparatus.

10. The extrusion apparatus of claim 1, wherein the controller comprises a control signal generator in communication with and for control of at least one of the material processing section and the speed control apparatus.

11. The extrusion apparatus of claim 1, wherein the signals comprise:
(a) heater continuity diagnostic data, heater resistance diagnostic data, solenoid diagnostic data, screw vibration diagnostic data, valve diagnostic data, leakage data, flow obstruction data, thermocouple diagnostic data, blower diagnostic data, and cooling system diagnostic data; and
(b) gear box diagnostic data, motor diagnostic data, bearing diagnostic data, motor and gearbox vibration diagnostic data, and lubrication diagnostic data.

12. The extrusion apparatus of claim 1, wherein the at least one algorithm generates predictive life messages and maintenance recommendations.

13. The extrusion apparatus of claim 1, further comprising a shroud assembly surrounding the barrel.

* * * * *